United States Patent
Materna

[19]

[11] Patent Number: 6,106,281
[45] Date of Patent: Aug. 22, 2000

[54] METHOD OF REDUCING THE FLOW OF GAS NEEDED FOR A CHAMBER WITH CONTROLLED TEMPERATURE AND CONTROLLED COMPOSITION OF GAS

[76] Inventor: Peter A. Materna, 81 Rector St., Metuchen, N.J. 08840-1540

[21] Appl. No.: 09/209,326

[22] Filed: Dec. 11, 1998

Related U.S. Application Data

[60] Provisional application No. 60/069,377, Dec. 12, 1997.

[51] Int. Cl.[7] ............................................. F27B 5/04
[52] U.S. Cl. ................... 432/198; 432/152; 219/388; 228/42
[58] Field of Search ............................ 432/143, 144, 432/128, 145, 152, 198, 200; 219/388; 228/180.1, 180.21, 180.22, 42

[56] References Cited

U.S. PATENT DOCUMENTS

| | | | |
|---|---|---|---|
| 4,551,091 | 11/1985 | Paterson | 432/198 |
| 4,920,998 | 5/1990 | Deitrick et al. | 432/198 |
| 5,295,621 | 3/1994 | Tsujimoto et al. . | |
| 5,338,008 | 8/1994 | Okuno et al. . | |
| 5,356,066 | 10/1994 | Yamada . | |
| 5,358,167 | 10/1994 | Tachibana et al. . | |
| 5,364,007 | 11/1994 | Jacobs et al. . | |
| 5,409,159 | 4/1995 | Connors et al. . | |
| 5,467,912 | 11/1995 | Mishina et al. | 219/388 |
| 5,472,135 | 12/1995 | Taniguchi et al. . | |
| 5,478,005 | 12/1995 | Nguyen . | |
| 5,653,587 | 8/1997 | Heller et al. . | |

*Primary Examiner*—Denise L. Ferensic
*Assistant Examiner*—Gregory A. Wilson
*Attorney, Agent, or Firm*—Peter Materna

[57] ABSTRACT

A temperature-controlled chamber, such as an inerted oven for soldering, in which the buoyancy-induced motion of gas at the opening of the chamber is suppressed by adjusting the densities of gases. In one embodiment the inertant gas is chosen to be a mixture of inert gases such that the density of warm gas inside the oven approximately equals the density of the external atmosphere. In another embodiment, a buffer region of density-matched warm air is provided between the warm inertant inside the oven and the external atmosphere. The result is reduction in the consumption of inertant.

20 Claims, 8 Drawing Sheets

FLOW FIELD SHOWING VELOCITY VECTORS
FOR LARGEST VELOCITY ENTERING TUNNEL
(1m/sec)

FLOW FIELD SHOWING VELOCITY VECTORS FOR INTERMEDIATE VELOCITY ENTERING TUNNEL
(0.1m/sec)

TOP SURFACE OF TUNNEL

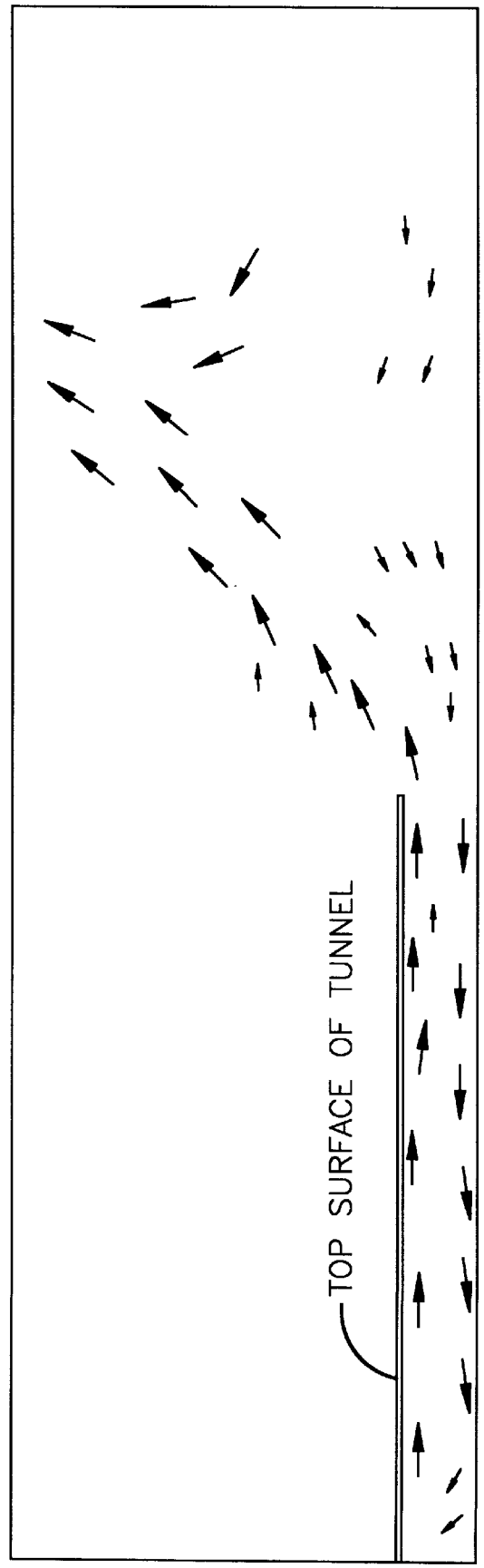

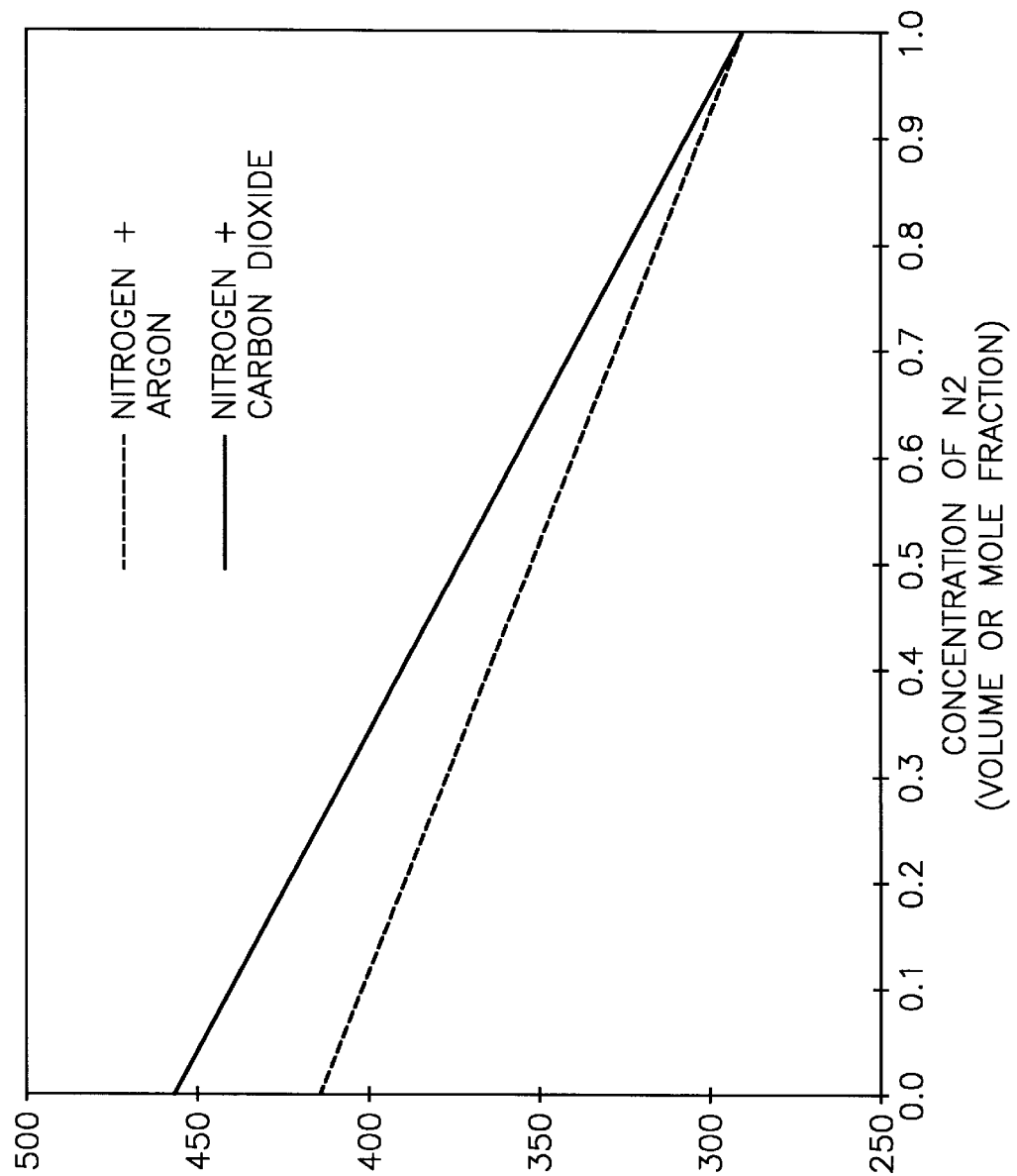

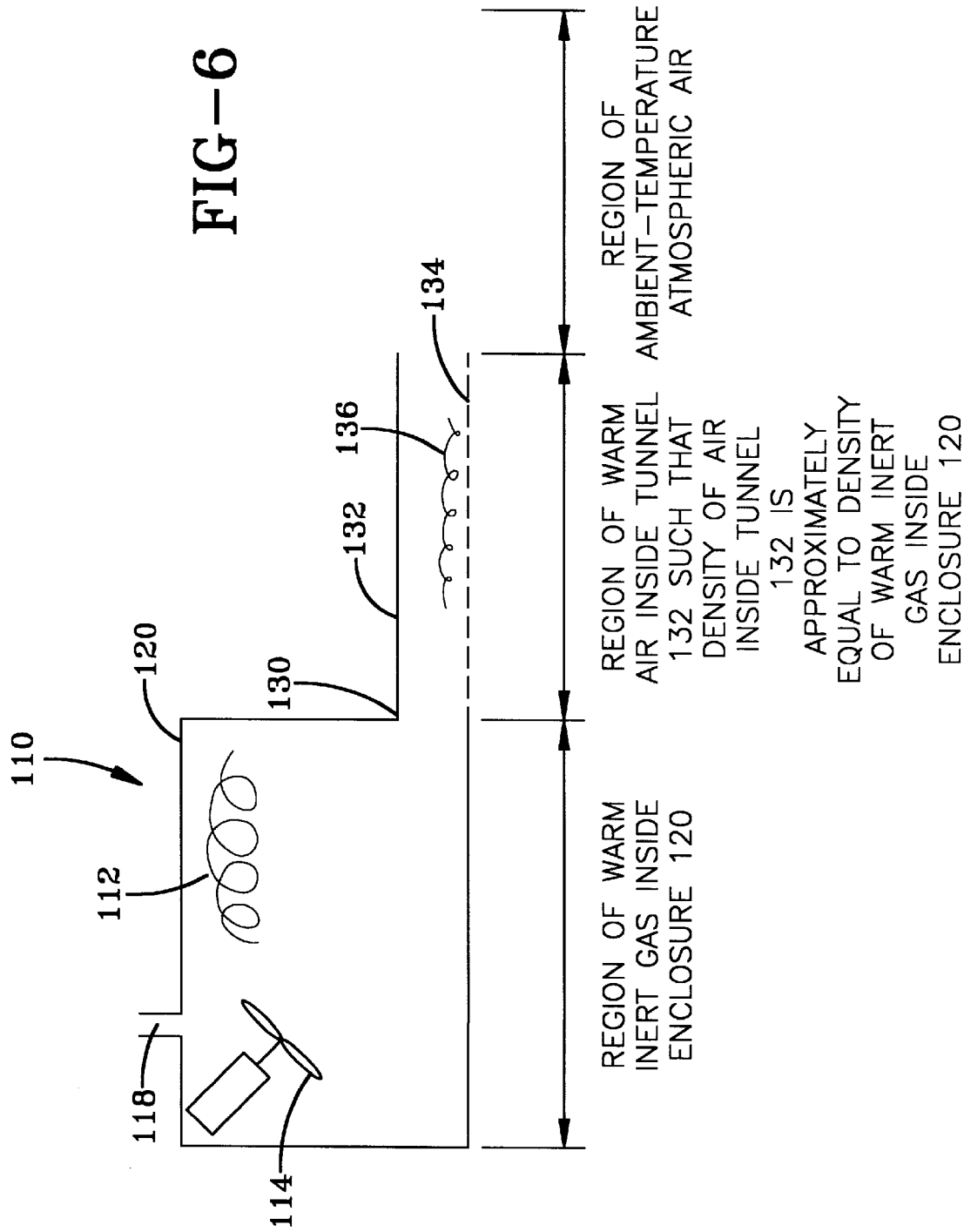

ized positions of the components on the circuit
METHOD OF REDUCING THE FLOW OF GAS NEEDED FOR A CHAMBER WITH CONTROLLED TEMPERATURE AND CONTROLLED COMPOSITION OF GAS This is a nonprovisional patent application corresponding to provisional patent application Ser. No. 60-069377, filed by Peter Materna, same title, on Dec. 12, 1997.

FIELD OF THE INVENTION

The present invention relates to the field of temperature-controlled chambers, in which the gas inside the chamber must have a specific composition.

BACKGROUND OF THE INVENTION

There are various industrial processes which require exposing objects to a controlled non-ambient temperature while simultaneously maintaining a specific composition of the gas to which the objects are exposed while in the controlled-temperature zone. Commonly the controlled gas composition is oxygen-deficient so as to prevent oxidation or corrosion at the controlled temperature, particularly if the controlled temperature is hot. In many such processes there must be a continuous movement of objects into or out of the controlled-temperature zone, typically on a conveyor. This requires the presence of one or more openings (ports) in the boundary of the controlled-temperature chamber. Together, these features create conflicting requirements whereby the openings (ports) and the temperature difference between the chamber and the external atmosphere encourage motion of gas and inleakage of the external atmosphere, but the inleakage of the external atmosphere works against the requirements for controlled composition of the gas inside the chamber.

Perhaps the best example of such a process is ovens used in the electronics industry to attach electronic components to printed circuit boards. A common type of oven is a solder reflow oven, in which electronic components are placed in precise position on circuit boards (Printed Wiring Boards) along with unmelted solder, and the circuit board is moved through an oven of appropriate temperature distribution to melt the solder and cause attachment of the components to the circuit board. Some solder reflow ovens require an inert atmosphere to prevent oxidation of the solder. A similar situation occurs in wave soldering apparatus, in which a pool of liquid solder must be maintained for extended periods of time with a very clean surface. In those soldering operations for which inerting is necessary, typically the inert gas used to create the oxygen-deficient atmosphere is nitrogen, for economic reasons. A typical desired maximum oxygen concentration is 25 parts per million. In order to maintain the concentration of oxygen in the oven at desired low levels, a continuous flow of inertant is fed into the oven and a corresponding outflow of gas occurs at the ports of the oven with that gas outflow essentially pushing back oxygen which would otherwise enter at the oven ports. The chief reason why this is necessary is that the hot nitrogen inside the oven is less dense than the ambient-temperature air outside, and this density difference causes a buoyancy-driven flow pattern in the vicinity of the ports of the oven. This buoyancy-driven flow pattern promotes mixing of oxygen-containing air with the inert gas and can actually bring a distinct flowpath of oxygen-containing air into the oven. For ovens which operate for long periods of time, which have appreciable areas of entrance and exit opening, and which have significant purity requirements for the gas inside them, the operating expense due to consumption of nitrogen can be significant, e.g., tens of thousands of dollars per year.

RELATED ART

There are several strategies which are known in the industry to minimize the consumption of inertant gas by inerted ovens. The most basic is to minimize the cross-sectional area of the entrance and exit openings. For example, if the profile of the circuit board has tall objects and shorter objects on it, there is no need for the entire opening to be as tall as the tallest object on the circuit board. It is quite possible for the opening to be contoured according to the profile of the circuit board. Flaps or brushes can be used in some situations, although not so as to disturb the precisely located positions of the components on the circuit boards entering the oven. Frequently the openings of such an oven are equipped with extension coverings which may be referred to as tunnels. These tunnels probably also help to reduce the entry of oxygen. There may also be baffles inside the oven for a variety of purposes. Finally, an existing patent 5,653,587 relating to reducing inertant consumption makes use of the density difference between the warm inertant gas and the cooler external ambient atmosphere by designing ports which are on the bottom of the oven. In patent 5,653,587, the conveyor is such that it lifts the circuit boards up into the oven, then carries them horizontally through the oven, and then drops them down to exit the oven. However, this does involve added design complexity and expense mainly related to the changes of direction and complexity of motion of the conveyor.

OBJECTS OF THE INVENTION

Accordingly, it is an object of this invention to reduce the consumption of inertant gas which is required by a temperature conditioning chamber due to interchange of gas at the ports of the chamber.

It is further an object of the invention to accomplish this in a way which requires minimal mechanical modification to conventional temperature conditioning chambers.

It is further an object of the invention to reduce the consumption of nitrogen inertant gas by ovens used in the manufacture of electronic circuit boards, such as solder reflow ovens and wave soldering ovens.

SUMMARY OF THE INVENTION

The invention reduces the flowrate of inertant gas needed to maintain a specified composition of gas inside the chamber, by reducing the intrusion of oxygen-containing air at the ports. Oxygen-containing atmospheric air intrudes at the ports because of a combination of two factors: (a) the mismatch of densities of the two gases, namely, the density of the warm inert gas inside the oven and the density of the atmospheric air which is outside the oven; and (b) the presence of the boundary between the two different species at approximately the same location as the density mismatch. The mismatch of densities causes buoyancy-driven flow patterns, and the presence of the boundary of the two species at approximately the same location as the density mismatch means that the buoyancy-driven flow patterns result in mixing of the two species. Once this is understood, the problem can be solved basically by ensuring that there is not a density mismatch at approximately the same place as the species boundary. In one embodiment, the solution is to eliminate the density mismatch, by making the densities of the two gases as closely equal to each other as possible, by selecting the composition of the inertant gas as a function of the temperature of the gas at the exit of the oven, so as to match the densities of the inertant gas and the exterior atmosphere. This is expected to suppress the buoyancy-driven flow pattern involving the warm inert gas and the ambient-temperature atmospheric air. In another embodiment, the density mismatch remains, but the geometry is arranged so that there is a buffer zone so that the place where the density mismatch occurs is physically separate from the place where the composition boundary occurs. In this embodiment the inertant remains nitrogen as is commonly used, but a buffer region is created. In embodiment number 2, warm nitrogen meets warm air of essentially equal density, creating no incentive for buoyancy-driven flow patterns, and somewhat further away the warm air meets ambient-temperature air allowing buoyancy-driven flow patterns but the buoyancy-driven flow patterns are between identical species so that they are not really harmful as far as bringing oxygen-containing atmospheric air into the interior of the enclosure.

BRIEF DESCRIPTION OF THE DRAWINGS

FIG. 1b shows a cross-sectional view of FIG. 1a.

FIG. 2a, 2b and 2c show estimated flow patterns at a centrally located vertical cross-section of FIG. 1a, for various flowrates of supply gas, including the effects of buoyancy-driven flows.

FIG. 3 shows the compositional variation for nitrogen-argon mixtures and for nitrogen-carbon dioxide mixtures, suitable to achieve density matching for various temperatures of gas at a port.

FIG. 6 shows a second embodiment of the invention, which involves creating a buffer zone of warm air.

DETAILED DESCRIPTION OF THE INVENTION

Figure 1A:
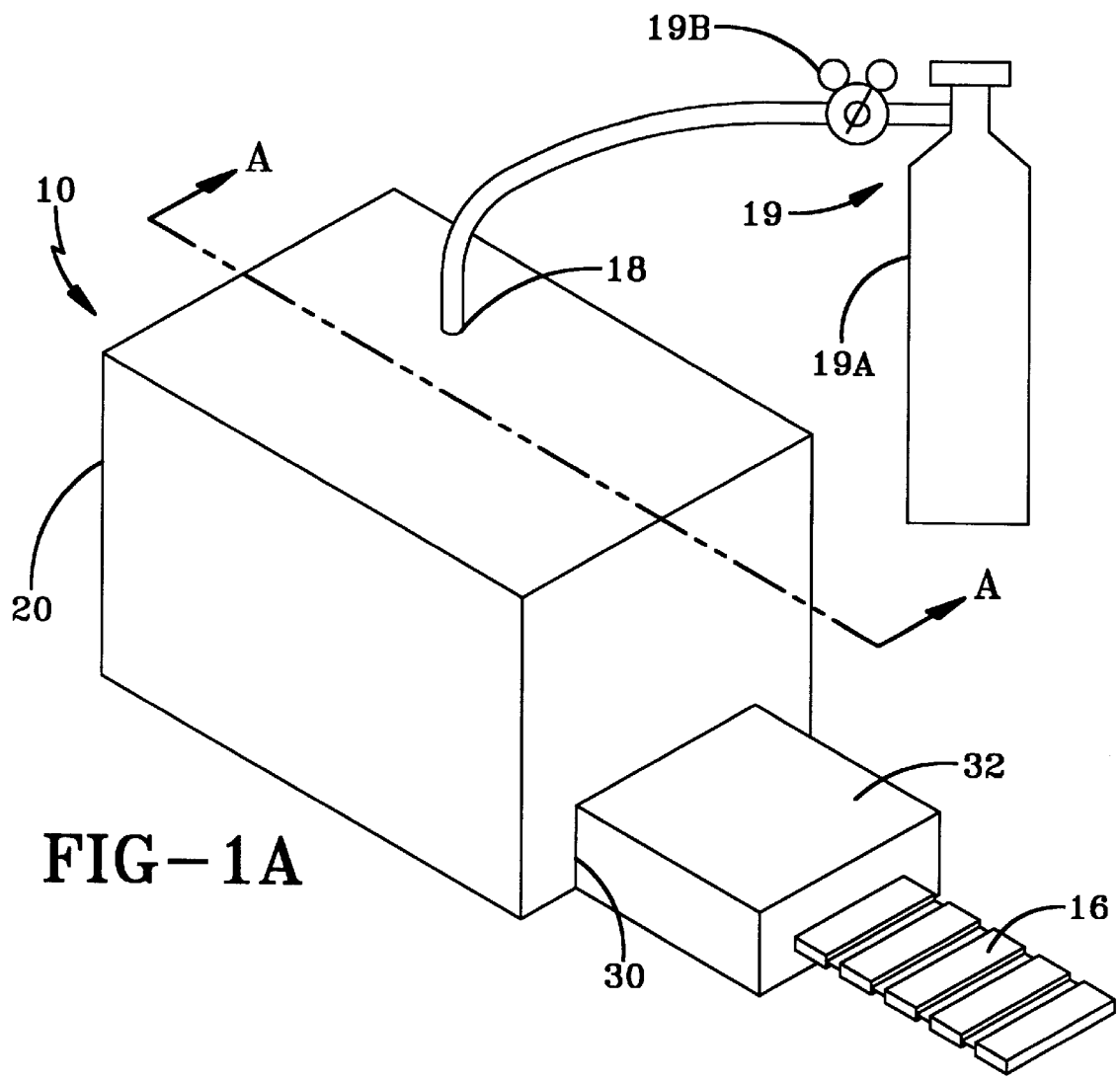
FIG. 1a shows a perspective view of a typical oven using the present invention.

In order to understand the present invention, it is helpful to identify, with reference to an oven for the manufacture of printed circuit boards, all possible ways by which oxygen might enter the oven.

First of all, there is diffusion among different gas species. Consider an enclosure filled with stationary inert gas, at whose opening there is an immediate transition to a body of stationary atmospheric (oxygen-containing) air. Consider also that there is no bulk motion of gas due to moving objects, density differences or pressure differences. Such a meeting of different species is fundamentally a situation which drives diffusion. Diffusion is a mixing of gases at the molecular level due to the motion of their molecules as described by the kinetic theory of gases. In fact, the mixing of gas species due to diffusion would describe a limiting case as to how pure the gas inside the chamber can be maintained or for how long. It can be estimated that for the situation of a solder reflow oven or wave soldering oven, diffusion is not one of the major sources of oxygen entry, at least not in comparison with the next-described opportunities for oxygen entry.

Second, there is possible outgassing or release of oxygen trapped within the pores of solid materials which are brought into the oven, such as the polymeric materials making up much of the circuit board. Such outgassing would be somewhat accelerated by the high temperature to which the circuit boards and other materials are exposed as they travel through the oven. However, this is also neglected here.

Third, there is perhaps some air which is carried into the oven contained in small cavities and irregularities of the components which enter the oven. For example, every chip or component which is placed on the printed circuit board has a somewhat hidden region between its underside and the surface of the board, and the conveyor may similarly have some hidden pockets. The air in these regions is probably not replaced by nitrogen as quickly as the air in the more wide-open regions of the circuit board. At least some of this air might be physically carried into the interior of the oven, and then mixed with the rest of the gas in the oven. This contribution of oxygen is also not dealt with in the present invention.

Fourth, the oxygen contribution which is believed to be the major source, and which is remedied by the present invention, is bulk motion of gas due to buoyancy effects, driven by differences in density. The essence of the invention is to appreciate that departure of nitrogen from the oven and intrusion of oxygen-containing atmospheric air is caused by differences in densities of gases, which produces natural convection flow patterns. The nitrogen in the oven differs from surrounding atmospheric air in two ways. First, nitrogen, with a molecular weight of 28.01, has a slightly different molecular weight from air, whose effective molecular weight is 28.96. This makes the density of nitrogen slightly less than the density of air of the same temperature and pressure. Second and more importantly, the nitrogen in the oven is warm, which further makes it less dense than the surrounding atmospheric air at ambient temperature. In combination, these two factors cause warm nitrogen to rise in a buoyancy-driven plume from any penetration through the oven boundary (such as from the end of a tunnel). When a plume rises from the end of the oven or the exit tunnel, there is a tendency for its place to be taken by an opposing layer of dense gas creeping inward along the bottom. This can result in intrusion of atmospheric air by means of a layer of ambient-temperature air creeping into the oven along a bottom surface. The word plume may be used to describe the rising low-density gas and the word creeper may be used to describe the reverse-direction flow of atmospheric air filling the void left by the plume. Presumably when the atmospheric air in the creeper reaches into the oven proper, the atmospheric air can be further mixed and redistributed by the motion of gas which exists inside the oven. Frequently inside the oven itself there is forced circulation driven by fans or blowers, or at least natural circulation driven by temperature nonuniformities within the oven. Thus, the principal purpose of the continuous outflow of nitrogen is to push back this layer of atmospheric air which wants to enter the passageway along the bottom as a creeper to fill the space not occupied by the plume. Again, because the oven is at an elevated temperature, the plume is relatively low-density and wants to rise, and the creeper containing higher-density atmospheric air occurs at the bottom of the port or tunnel. (The reverse would be true if the temperature-controlled chamber was cold, as is described later.) This situation is also analogous to the situation of an estuary where a freshwater river meets the ocean, where there is some tendency for salinity to penetrate into the estuary. It is known that if there is a relatively large flowrate of fresh water in the river, salinity will not penetrate very far upstream in the estuary, and if there is only a small flowrate of fresh water, salinity will penetrate further upstream in the estuary.

EMBODIMENT 1

In essence, it is expected that if it were possible to very nearly equalize the density of the warm inert gas and the density of the atmospheric air or noninert gas which it next meets, then there should be little or no reason for buoyancy-driven flow patterns to occur, and it should be possible to significantly reduce the intrusion of oxygen into the oven caused by buoyancy-driven flow patterns, and hence to significantly reduce the required flowrate of nitrogen out of the oven, and hence the demand by the oven for pure nitrogen.

Figure 1B:
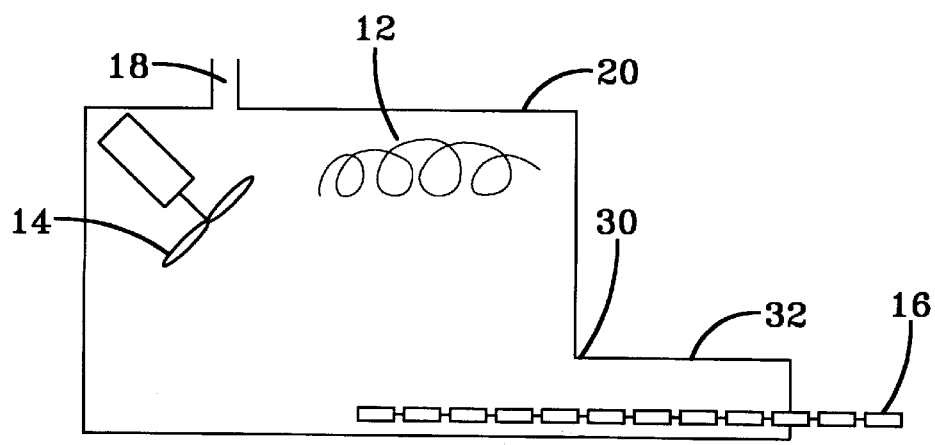

Referring now to the figures, there is shown in FIG. 1a and 1b a typical oven 10 of the present invention. FIG. 1b is a cross-section of FIG. 1a taken along the section AA identified in FIG. 1a. Oven 10 comprises an enclosure 20 which contains inside it a heat source 12, which is typically electrical resistive heating. Inside enclosure 20 may also be a fan or blower 14 to circulate the gas inside enclosure 20 to promote uniformity of temperature. Penetrating through surfaces of enclosure 20 is port 30, through which objects may be brought into or out of enclosure 20. For the present illustration, enclosure 20 is shown as being rectangular prismatic and port 30 is shown as being in a side of enclosure 20. However, none of these details is essential. Port 30 could actually be in any surface of enclosure 20 at any orientation.

Passing through port 30 may be a conveyor 16 which brings objects into and out of the oven. Attached to port 30 may be tunnel 32, which is a hollow enclosure conforming to the shape of port 30 and extending some distance out from enclosure 20. Tunnel 32 may surround conveyor 16 and may be made of sheet metal or similar material, as may enclosure 20. Tunnel 32 is optional, but may be of some help in reducing oxygen intrusion especially in later-described embodiments. Tunnel 32 is such that it places some separation distance between the interior of enclosure 20 and the place where the warm oven gas meets the atmospheric air and undergoes mixing. Also attached to enclosure 20 is fill connector 18 by which a flow of inert gas is introduced into enclosure 20 from inert gas source 19, which may comprise a cylinder of gas 19a and a regulator 19b.

Figure 2A:
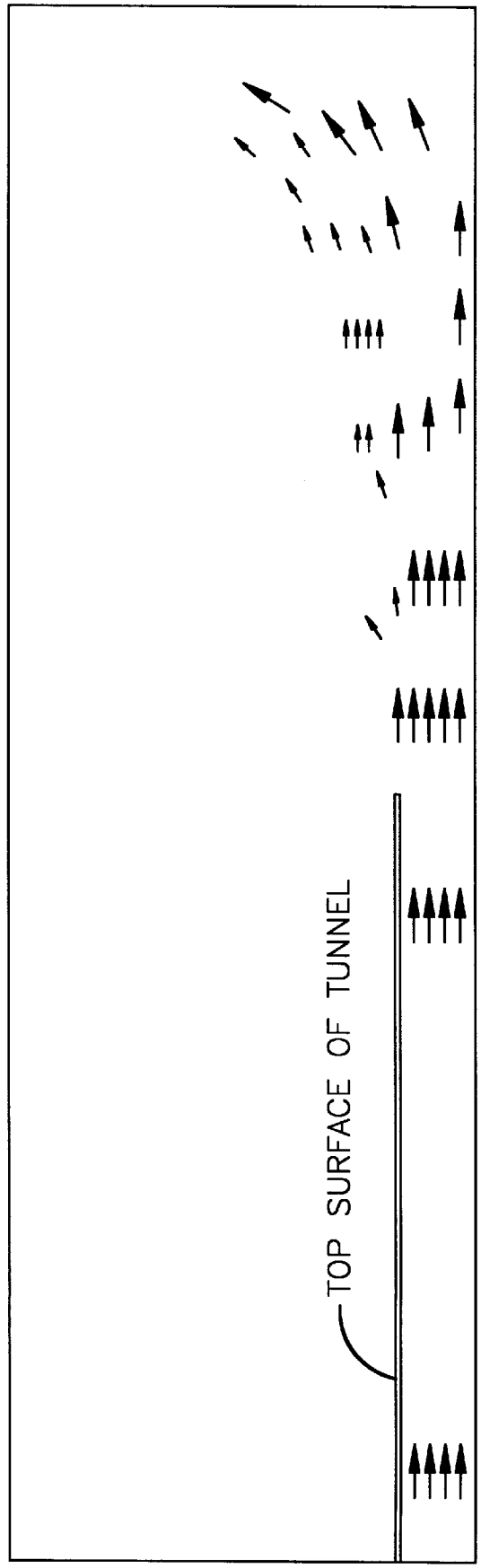
Figure 2B:
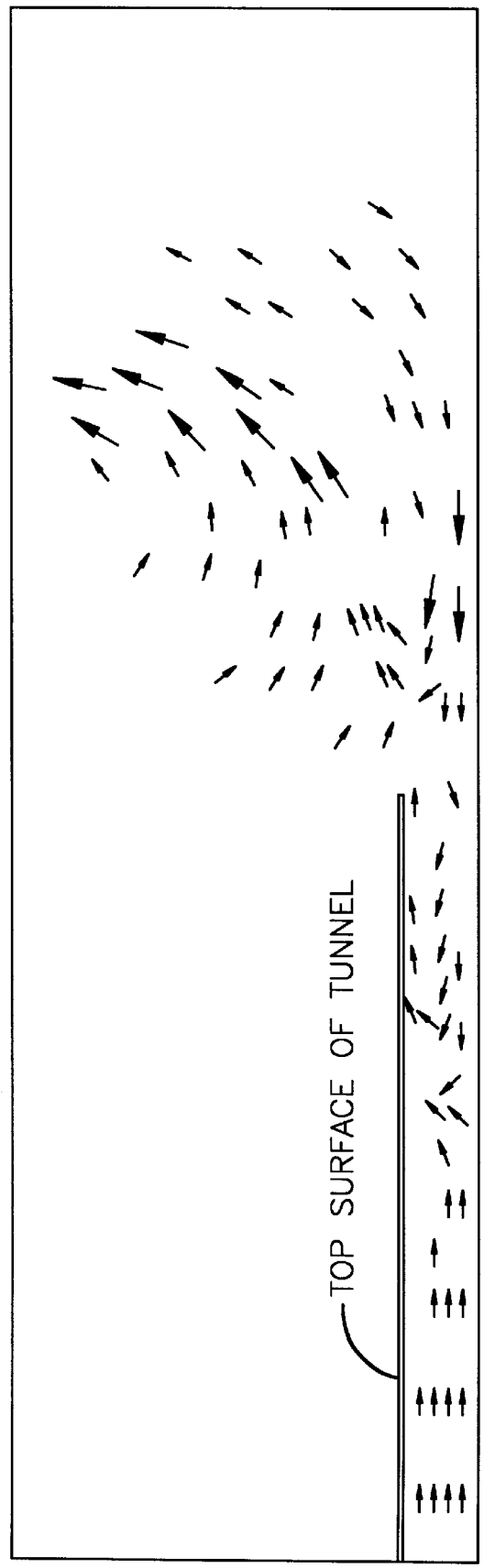

Referring now to FIG. 2a, 2b and 2c, these figures show qualitative descriptions of flow vectors near port 30 and tunnel 32 under typical operating conditions for solder reflow ovens, in the absence of the present invention. FIGS. 2a, 2b and 2c are estimated flow patterns at cross-sections taken at a vertical plane which is along the midplane of tunnel 32 and conveyor 16, section AA as labeled in FIG. 1a. The analysis is two-dimensional. In general, properties of air at atmospheric pressure and typical oven dimensions are assumed, but none of these are critical. FIGS. 2a, 2b and 2c are estimated (calculated) flow patterns for a simple geometry representative of an oven port, with simple boundary conditions representative of an oven port. The assumed geometry for these figures is that of a tunnel having a ceiling, with the ceiling serving as a solid wall boundary starting at a point at the left edge of the analysis region and extending partway out into the analysis region until it ends at the tunnel end. The lower left side boundary of the analysis region corresponds to where the tunnel joins the main body of the oven. The portion of the analysis region outside the tunnel (to the right of and above the tunnel) corresponds to atmospheric air. The most important boundary condition is that inside the tunnel at the left edge of the analysis region, the gas is constrained to be warm (at a temperature typical of the inside of the oven) and also is constrained to be flowing outward from the oven enclosure into the tunnel (from left to right) at a specified velocity across the entire cross-section of the entrance from the oven to the tunnel. The temperature of the atmospheric air outside the tunnel is ambient (room) temperature. In FIGS. 2A, 2B and 2C, the specified velocity of warm gas flowing into the tunnel at the left boundary has three different values, differing by one order of magnitude from case to case (1 m/s, 0.1 m/s and 0.01 m/s). In any of these three figures the scale of length of velocity vectors is roughly related to the magnitude of the input velocity entering the tunnel for that case, and is not the same as for the other figures. In each figure, only selected velocity vectors are plotted, the ones which best illustrate the flow-field.

FIG. 2A shows the estimated flowfield for the largest flowrate of gas from the oven port, a flowrate which would do the best job of keeping the internal atmosphere inert but would probably be undesirably or unnecessarily expensive in its consumption of inertant. In this flowfield the gas issues from the tunnel somewhat as a jet, presenting essentially no opportunity for a creeper (reverse flow) in the tunnel which would bring oxygen-containing atmospheric air into the oven. Once the jet leaves the tunnel, it rises somewhat due to buoyancy.

FIG. 2B shows the estimated flowfield for the medium flowrate of gas from the oven port. In this flowfield, because of buoyancy, the flow exiting the tunnel stays somewhat to the top of the tunnel rather than occupying the entire tunnel cross-section as in FIG. 2A and form a bit more of a plume rather than a jet upon exiting the tunnel. Corresponding to the warm inert gas rising, a creeper (a flowpath of relatively cool atmospheric air flowing into the tunnel along its bottom) is visible entering the tunnel. Although the creeper enters the tunnel, it does not reach all the way to the point where the tunnel joins the interior of the chamber, because before the creeper can reach there it is turned around or swept out by the exiting flow, thereby mixing with the exiting flow. It is believed that recirculation eddies may occur in certain places such as inside the tunnel where the creeper is turned around. A situation like this would probably still maintain the purity of the gas inside the oven reasonably well.

FIG. 2C shows the estimated flowfield for the lowest flowrate of gas from the oven port. In this case a creeper forms similar to that in FIG. 2B, but the creeper persists all the way down the length of the tunnel to the point where the tunnel joins the oven. At the place where the tunnel joins the oven, the creeper is shown as being turned around (but the oven itself was not part of the model). The plume and the creeper remain somewhat stratified, with an outflowing stream of warm gas persisting at the top of the tunnel along most of the length of the tunnel and an inflowing creeper of ambient-temperature atmospheric air persisting at the bottom of the tunnel along most of the length of the tunnel. When the creeper reaches the point where the tunnel joins the oven, the creeper, which contains oxygen-containing atmospheric air, is subject to mixing with the gas inside the oven and is likely to contaminate that gas. This illustrates a situation where the flowrate of inertant is probably too small.

These flowfields illustrate that a significant flow phenomenon is buoyancy, with the hot inertant gas rising in a plume after it leaves the end of tunnel 32 which is farthest away from enclosure 20. Depending on other details, the rising and exiting of the plume may allow cool atmospheric air to enter the tunnel 32 along the bottom of tunnel 32 and in some instances even to creep inward a substantial distance toward enclosure 20. For present purposes this bulk flow of atmospheric air into tunnel 32 may be termed a creeper 62.

If creeper 62 extends sufficiently far into tunnel 32 it may enter enclosure 20, where its mixing with the contents of enclosure 20 may be further enhanced by the circulation within enclosure 20 which is created by fan 14. This is the least desirable situation as far as maintenance of a specified atmosphere inside enclosure 20. The function of a flowrate of inertant gas flowing out through port 30 and (if present) tunnel 32 is to essentially push back or sweep out the creeper 62 so that it does not enter the enclosure 20. The higher the flowrate of inertant, the more efficiently this can be accomplished, but flowrate of inertant of course incurs the financial cost of consuming inertant.

For a typical application of a solder reflow oven, the temperature of the inertant gas exiting from tunnel 32 is about 100 C (373 K), which compares with a likely outside atmospheric temperature (room temperature) of about 23 C (300 K). The density of an ideal gas is given by $p/(R*T)$, with R being 8314 divided by the molecular weight of the gas. Everywhere in a vented oven application, the absolute pressure will be essentially equal and may be taken to be 101325 Pa. At 300 K the density of atmospheric air (whose effective molecular weight is 28.96) is $(101325\ Pa)*(28.96)/(8314*300\ K)$ or 1.176 kg/m^3. At 373 K the density of nitrogen (the usual inertant) (whose molecular weight is 28.01) is $101325*28.01/(8314*373)$ or 0.915 kg/m^3. This fairly significant difference in density is the driver for buoyancy-driven flow patterns.

However, there remains one variable by which to adjust the density of the inertant gas even if the temperature and pressure are as stated. That variable is the molecular weight of the inertant. For a gas at 373 K to achieve the density of 1.176 kg/m^3, which is the density of the assumed outside atmosphere of air at 300 K, that gas would have to have a molecular weight of $28.96*373/300$, or 36.01. This molecular weight does not correspond exactly to any pure species of gas, but can be achieved fairly easily by means of a mixture of a heavier gas and a lighter gas. For reasons of economics, the three main candidate inert gases are nitrogen (molecular weight of 28.01) at the light end, and argon (molecular weight of 39.95) and carbon dioxide (molecular weight of 44.01) at the heavy end of the scale. Fortunately, the required effective molecular weight of 36.01, for the assumed conditions, is between those two and so is achievable by a mixture. Specifically, the mixture would have to be about 67% argon, 33% nitrogen (mole fractions or volume fractions) for the assumed temperature limits of 373 K and 300 K. Such a composition would match the densities of the two gases and essentially eliminate tendencies for buoyancy. For a mixture of carbon dioxide and nitrogen, the composition for matching density would be 50% carbon dioxide, 50% nitrogen. It is expected that matching the densities in this way would significantly reduce the flowrate of inertant necessary to maintain the required low oxygen concentration inside the oven, by reducing or eliminating buoyancy-driven flow patterns.

If the temperature inside the oven (most specifically the temperature near the port) were extremely high the situation might be such that the higher molecular weight of argon or even carbon dioxide would not be enough to achieve the proper gas density. There are perhaps a few other candidate inert gases of even higher molecular weight, such as sulfur hexafluoride. However, it is believed that cases of practical interest for soldering ovens are such that the temperature of the gas near the opening is such that the required gas density would be achievable by a gas which is a mixture of nitrogen and either argon or carbon dioxide. FIG. 3 shows the compositional variation for nitrogen-argon mixtures and for nitrogen-carbon dioxide mixtures, suitable to achieve density matching for various temperatures of gas at a port.

It is expected that the optimum situation for reducing buoyancy-driven flow patterns is as has been described, namely achieving equality of density between the gas inside the enclosure and the atmospheric air outside the enclosure. However, it is also believed that even if exact equality of densities is not achieved, there is still benefit in bringing the two densities closer together than is the case for the unmodified situation such as warm nitrogen and ambient-temperature atmospheric air.

Another possible benefit of reducing the required inertant flowrate by reducing or eliminating buoyancy-driven flow patterns is that this will likely result in some reduction in the heater power required to keep the oven at its specified operating temperature.

Figure 4:
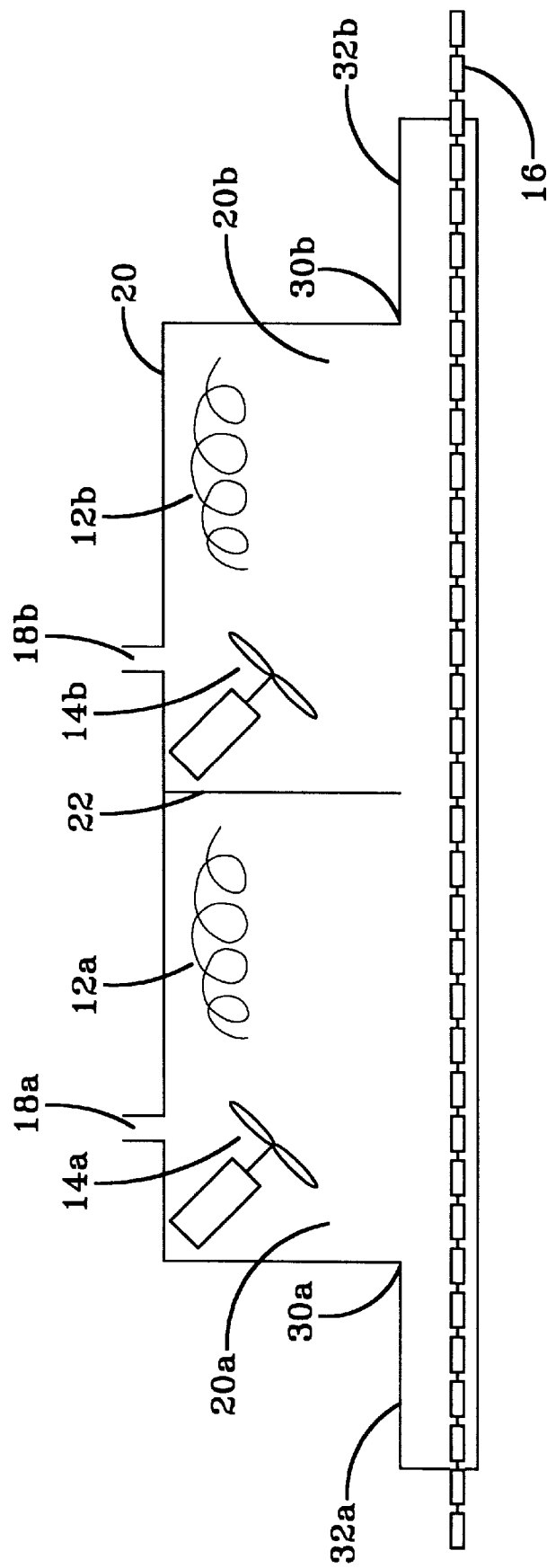
FIG. 4 shows a cross-sectional view of an oven similar to that of FIG. 1a, except that there are two zones each comprising its own port, heater, fan and gas connection port.

It can be noted that although FIG. 1a and FIG. 1b have for simplicity shown an enclosure with one port, the enclosure of a temperature-controlled chamber such as an oven for circuit boards frequently has two ports, an entrance and an exit for continuous processing. In a solder reflow oven, the temperature profile within the oven as a function of distance along the conveyor path is specifically determined and usually not symmetric. Typically in a solder reflow oven the heatup to which the circuit boards are subjected is relatively more gradual and the cooldown relatively more rapid. Thus, for purposes of creating buoyancy-driven flow patterns, the effective temperature of the gas near the entrance port may not be the same as the effective temperature of the gas near the exit port. In this situation, one composition of gas would not suffice to achieve density-matching at both ports simultaneously. Of course, it would be possible to use one composition which simply came close to achieving density-matching at both ports or achieved it at one port and not the other. Alternatively, it would be possible to subdivide the interior of enclosure 20, as shown in FIG. 4, into two regions 20a and 20b by means of baffle 22. In this way the conveyor belt 16 is still able to pass through baffle 22, but otherwise baffle 22 provides some impediment to the intermixing of the gas in region 20a and the gas in region 20b. Region 20a contains heater 12a, fan 14a, gas connection 18a and port 30a, while region 20b contains heater 12b, fan 14b, gas connection 18b and port 30b. Ports 30a and 30b may be on opposite sides of enclosure 20 so that conveyor 16 may pass through in a straight line. As a result of having all of these features duplicated for each region, region 20a can be maintained at a temperature which is different from the temperature of region 20b. Corresponding to this, the inert gas which is supplied to gas connection 18a can be of a composition appropriate to achieve density matching at port 30a for the unique gas temperature at port 30a, and the inert gas which is supplied to gas connection 18b can be of a different composition appropriate to achieve density matching at port 30b for the unique gas temperature at port 30b. Of course, even more zones could similarly be created inside the overall oven, whether nor not each zone had a port.

It may be appreciated that this technique of matching density by manipulation of the composition of the gas inside the temperature-controlled chamber may also be used in the reverse direction if the temperature at which the enclosure is maintained is colder than the ambient temperature of the outside atmosphere. In the case of a refrigerated chamber, convection may be suppressed by the use of a fill gas whose effective molecular weight is smaller than that of air.

For use in a refrigerated situation, there are only a few candidate gases. Nitrogen has a molecular weight smaller than that of air, but its molecular weight is only marginally smaller than that of air and so the benefit may be similarly limited. Helium has a molecular weight which is significantly smaller than that of air and so, despite the fact that it is moderately expensive, it would probably be the best additive for density-matching in a refrigeration situation. Hydrogen, of course, also has a significantly low molecular weight but its combustibility would make it hazardous for almost all applications.

Figure 5:
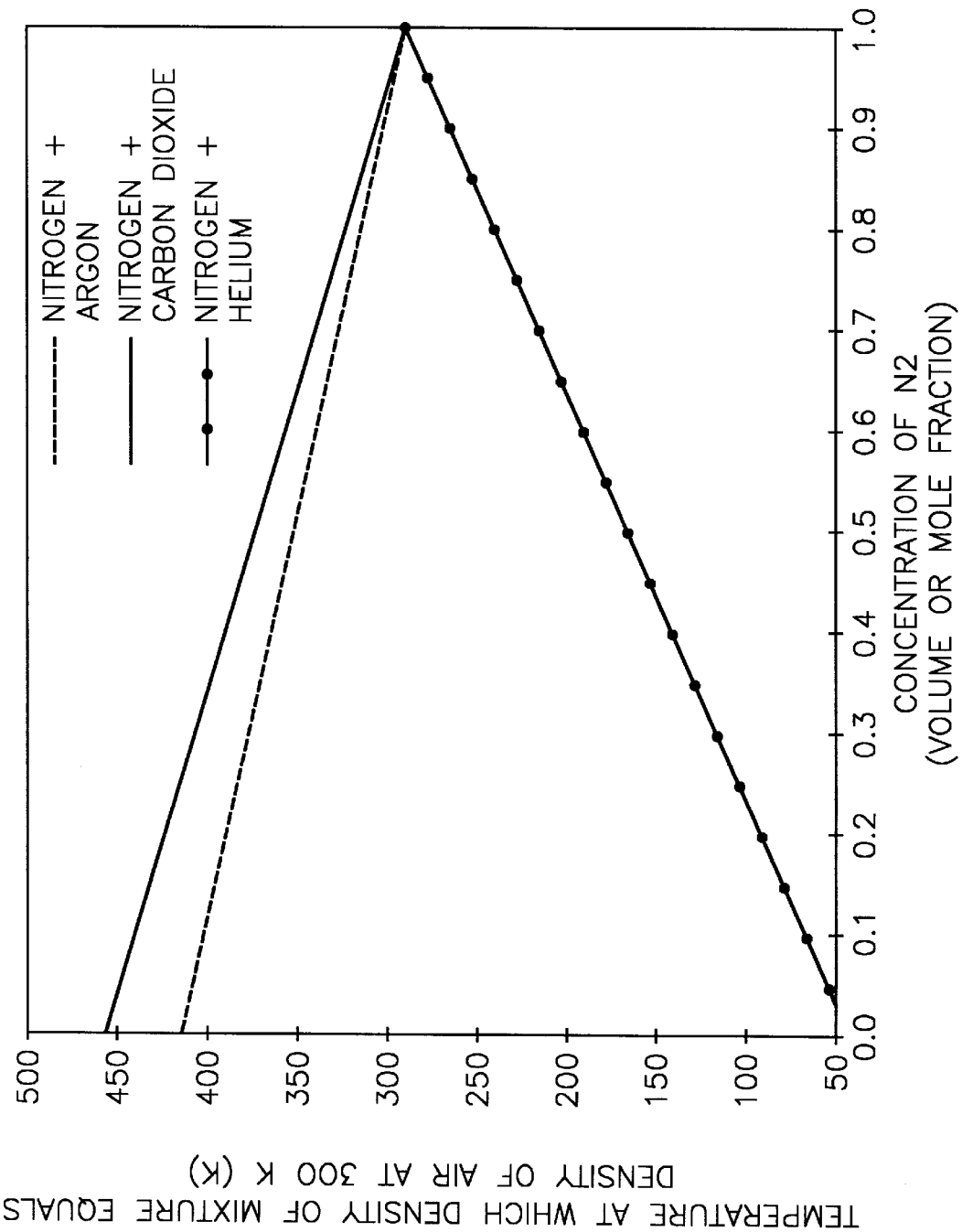
FIG. 5 shows the compositional variation for a nitrogen-helium mixture, suitable to achieve density matching in a refrigeration situation.

FIG. 5 is a chart giving the temperature at which density of gas mixture can be made to match the density of ambient atmospheric air, as a function of the composition of a nitrogen-helium mixture, for applications at subambient temperatures (refrigeration).

For refrigeration applications, the possible use of density-matching through compositional adjustment has perhaps two possible benefits. One possible benefit would be maintaining a specified composition in the cold region. It has been found, for example, that storage time of certain foods is lengthened if they are stored in an oxygen-deficient atmosphere. Other than that, the need specifically for an oxygen-deficient atmosphere is perhaps less widespread at low temperatures than it is at high temperatures, because for example the chemical processes of oxidation and corrosion which motivate inerting of ovens are suppressed by cold temperatures. However, the other possible benefit of eliminating or reducing buoyancy-driven flow patterns is due to the fact that all of the mass transfer resulting from buoyancy-driven flow patterns represents power consumed in running the refrigeration equipment. The aspect of reducing the refrigeration power consumed may be particularly important in a process environment where articles are continually brought into and withdrawn from the cold region and hence there is some area which is always open to interchange of mass with the environment. In such a situation the power needed to run the refrigeration equipment, which can be significant, is affected by how much mixing or mass transfer occurs between the gas in the cold region and the gas in the ambient-temperature exterior. It is possible that density-matching could reduce this power consumption.

In the case where the controlled temperature chamber is refrigerated, the flow pattern would be the reverse of what is drawn in FIG. 2A, 2B and 2C, i.e., the buoyancy-driven plume would sink downward upon leaving the port or tunnel, and the so-called creeper would be along the ceiling of the tunnel.

With the present invention it is of course still desirable and perhaps even especially important to use the present invention in a room where the air is still and quiet, because a local breeze caused for example by the movement of a person, could disrupt the concentration of gas within the enclosure by temporarily introducing more atmospheric air into the interior of the enclosure.

EMBODIMENT 2

In embodiment 1, the difference in density between the gases inside and outside the temperature-controlled chamber was eliminated or minimized, so that buoyancy-driven flow patterns are eliminated or minimized. It is also possible to obtain benefit without the strategy of eliminating buoyancy-driven flow patterns. This next embodiment allows the continued use of pure nitrogen as the inertant, which probably is economically attractive. It achieves this by controlling the location of buoyancy-driven flow patterns so that the location of buoyancy-driven flow patterns is not the same as the location of the species boundary. In embodiment number 2, the arrangement of regions is a warm inert gas region, followed by a region of warm air chosen so that the density of the warm air essentially matches the density of the warm inert gas, followed by the atmosphere at ambient temperature. In embodiment number 2, warm nitrogen meets warm air of essentially equal density, creating no incentive for buoyancy-driven flow patterns, and somewhat further away the warm air meets ambient-temperature air allowing buoyancy-driven flow patterns but the buoyancy-driven flow patterns are between identical species so that they are not really harmful as far as bringing oxygen-containing atmospheric air into the interior of the enclosure. In essence, this allows generating the warm air of the intermediate region simply for the price of heating air to the proper temperature, which is probably minor.

Embodiment number 2 is shown in FIG. 6. By analogy with embodiment 1, it comprises temperature control chamber 110, enclosure 120, heater element 112 inside enclosure 120, fan 114 inside enclosure 120, and source of inert gas supply connection 118. There is also port 130 where tunnel 132 joins enclosure 120. Because the goal of this embodiment is to create a region of warm air next to the warm inert gas, it is helpful to place a local heater 136 somewhere in the vicinity of tunnel 132. Local heater 136 may be an electric resistive heater. It is preferably located near or at the bottom of tunnel 132 to guard against any possible thermal stratification such as was associated with the creeper in FIG. 2c especially. The bottom surface 134 of tunnel 132 may be porous so as to allow air to come up to local heater 136 from below by a chimney effect. However, the invention would also work if the bottom surface 134 were solid. The other surfaces of tunnel 132 are preferably solid. Bottom surface 134 may actually be the same component as local heater 136. The way this embodiment works is that it generates the buffer zone by heating air to the appropriate density. The matching-density gas (i.e., warm air) is essentially created by means of heat, which is a simple and inexpensive way of creating matchingdensity gas compared to what is involved in separating gas species. The air is free and the heat relatively inexpensive. By means of heating at the bottom, what could be a cold creeper is essentially made warm so that it wants to rise instead of entering the controlled-atmosphere enclosure 120. This alters the overall flow pattern so that there no longer is a creeper. At the far end of tunnel 132 (right hand end in FIG. 6) where tunnel 132 discharges to the atmosphere, there can be various buoyancy-driven flow patterns similar to those in FIG. 2, but they involve only the species air and they are physically separated from the boundary between inert gas and air near port 130, so the buoyancy-driven flow patterns are expected not to result in much mixing between inert gas and air.

Depending on details, local heater 136 could provide constant heat output per unit length or could be given some more complicated distribution of heat output. Embodiment number 2 could also be used in reverse in a situation of refrigeration. This would require that heater 136 become a cold source instead and be placed at the ceiling of tunnel 132, and the ceiling of tunnel 132 could be porous if desired. Embodiment number 2 could also be used in a multi-zone fashion just as was shown in FIG. 4 for embodiment number 1.

It can also be appreciated that, while the embodiments have been disclosed with a view towards minimizing contamination of an oxygen-deficient environment by an oxygen-containing environment at a port where they meet, the disclosed invention can also be used to minimize the mixing between an environment of any first composition and an environment of any second composition, whatever the reason for difference in composition. Furthermore, the principles described herein could even be used to prevent or minimize the mixing of liquids, since warmer liquids are similarly subject to buoyancy-driven flow patterns when exposed to cooler liquids, because the density of a typical liquid when it is warmer is similarly smaller than the density of the same liquid when it is cooler. In order to make the density of a warmer liquid (for example water) match the density of a cooler liquid, a solute (for example salt) could be added to that warmer liquid to help it match the density of cooler liquid.

Although several embodiments of the invention have been disclosed and described in detail herein, it should be understood that this invention is in no sense limited thereby and its scope is to be determined by that of the appended claims.

I claim:

1. A temperature-controlled chamber, comprising:
    an interior, an exterior and a first opening connecting the interior and the exterior,
    the interior comprising a first interior gas near the first opening, the first interior gas near the first opening having a first interior temperature, a first interior pressure, a first interior composition and a first interior density, the exterior comprising an exterior gas having an exterior temperature, an exterior pressure, an exterior composition and an exterior density, the first interior pressure and the exterior pressure being essentially equal to each other,
    wherein the composition of the first interior gas is chosen such that the first interior density is closer to the exterior density than would be the case if the first interior gas were a pure gas species,
    whereby there is achieved a reduction in the motion of the gases near the first opening driven by the difference between the first interior density and the exterior density.

2. The apparatus of claim 1, wherein the composition of the first interior gas is chosen such that the first interior density is closer to the exterior density than would be the case if the first interior gas were nitrogen.

3. The apparatus of claim 1, wherein the first interior density is essentially equal to the exterior density.

4. The apparatus of claim 1, wherein the exterior gas is air.

5. The apparatus of claim 1, wherein the first interior composition is chosen such that the fraction of oxygen in the first interior gas is less than the fraction of oxygen in air.

6. The apparatus of claim 5, wherein the flowrate of the gas into the interior of the temperature-controlled chamber is chosen to maintain the first interior composition such that the fraction of oxygen in the first interior gas is less than the fraction of oxygen in air.

7. The apparatus of claim 1, wherein the temperature-controlled chamber is used for reflow soldering or wave soldering or other soldering.

8. The apparatus of claim 1, wherein the first interior temperature is greater than the exterior temperature, and the first interior composition is chosen so that the effective molecular weight of the first interior gas is greater than the molecular weight of the exterior gas.

9. The apparatus of claim 8, wherein the first interior gas comprises nitrogen and one or more gases chosen from the group consisting of argon, carbon dioxide and sulfur hexafluoride.

10. The apparatus of claim 1, wherein the first interior temperature is less than the exterior temperature, and the first interior composition is chosen so that the effective molecular weight of the first interior gas is less than the molecular weight of the exterior gas.

11. The apparatus of claim 10, wherein the first interior gas comprises nitrogen and helium.

12. The apparatus of claim 1, wherein the effective molecular weight of the interior gas is chosen as the molecular weight of the exterior gas times the interior temperature divided by the exterior temperature, both temperatures being expressed in absolute scales.

13. The apparatus of claim 1, wherein the temperature-controlled chamber comprises a region of larger cross-section and a region of smaller cross-section, the region of smaller cross-section being located closer to the exterior than is the region of larger cross-section, the opening being defined as the place where the region of smaller cross-section meets the exterior.

14. The apparatus of claim 1, further comprising a second opening between the interior and the exterior, the gas near the second opening having a second interior temperature and a second interior pressure and a second interior composition and a second interior density, the second interior pressure being essentially equal to the exterior pressure, wherein gas having the first interior composition is supplied to the chamber by a first supply connection located near the first opening, and gas having the second interior composition is supplied to the chamber by a second supply connection located near the second opening, and wherein the second interior composition is chosen such that the second interior density is closer to the exterior density than would be the case if the second interior gas were a pure gas species.

15. The apparatus of claim 1, wherein the composition of the first interior gas is chosen for the purpose of minimizing the power required to maintain the temperature of the temperature-controlled chamber at a specified value.

16. A method of reducing buoyancy-driven flow at an opening of a temperature-controlled chamber having an interior and an exterior, the opening connecting the interior and the exterior, comprising supplying to the interior an interior gas which is a mixture of gas species chosen such that the density of the interior gas is closer to the density of the exterior gas than would be the case if the interior gas were a pure gas species.

17. A temperature-controlled chamber comprising an interior, a buffer region, an exterior and an opening, wherein the buffer region is between the interior and the exterior and the opening connects the buffer region with the exterior, the interior comprising an interior gas, the interior gas having an interior temperature, an interior pressure, an interior composition and an interior density, the buffer region comprising a buffer gas, the buffer gas having a buffer temperature, a buffer pressure, a buffer composition and a buffer density, the exterior comprising an exterior gas, the exterior gas having an exterior temperature, an exterior pressure, an exterior composition and an exterior density, the interior pressure and the exterior pressure and the buffer pressure all being essentially equal to each other, wherein the composition of the exterior gas is air and the composition of the buffer gas is air and the density of the buffer gas is closer to the density of the interior gas than would be the case if the buffer temperature were the exterior temperature.

18. The apparatus of claim 17, wherein the interior gas is nitrogen, the temperature of the temperature-controlled chamber is greater than the exterior temperature, and the buffer temperature is greater than the exterior temperature.

19. The apparatus of claim 18, wherein the temperature-controlled chamber comprises a region of larger cross-section and a region of smaller cross-section, the region of smaller cross-section being located closer to the exterior than is the region of larger cross-section, the opening being defined as the place where the region of smaller cross-section meets the exterior, the the buffer region being the region of smaller cross-section, the region of smaller cross-section having a bottom, wherein the first interior temperature is greater than the exterior temperature, and wherein heat is supplied to the bottom of the region of smaller cross-section, whereby there is achieved a reduction in the tendency for exterior gas to enter the temperature-controlled chamber.

20. The apparatus of claim 19, wherein the heated bottom is porous.

* * * * *